United States Patent [19]
Anton

[11] Patent Number: 5,093,885
[45] Date of Patent: Mar. 3, 1992

[54] FIBER OPTIC CONNECTOR MODULE

[75] Inventor: Mark A. Anton, Minneapolis, Minn.

[73] Assignee: ADC Telecommunications, Inc., Minneapolis, Minn.

[21] Appl. No.: 671,989

[22] Filed: Mar. 15, 1991

Related U.S. Application Data

[63] Continuation of Ser. No. 551,423, Jul. 11, 1990, abandoned.

[51] Int. Cl.⁵ ............................ G02B 6/00; G02B 6/36
[52] U.S. Cl. ..................................... 385/134; 385/135
[58] Field of Search ........................... 350/96.20–96.23

[56] References Cited

U.S. PATENT DOCUMENTS

| | | | |
|---|---|---|---|
| 4,627,686 | 12/1986 | Szentesi | 350/96.20 |
| 4,630,886 | 12/1986 | Lauriello et al. | 350/96.20 |
| 4,702,551 | 10/1987 | Coulombe | 350/96.22 X |
| 4,708,430 | 11/1987 | Donaldson et al. | 350/96.20 |
| 4,728,171 | 3/1988 | Schofield et al. | 350/96.22 X |
| 4,840,449 | 6/1987 | Ghandeharigadeh | 350/96.20 |
| 4,861,134 | 8/1989 | Alameel et al. | 350/96.20 |
| 4,961,623 | 10/1990 | Midkiff et al. | 350/96.23 X |
| 4,995,688 | 7/1989 | Anton et al. | 350/96.10 |

Primary Examiner—Akm Ullah
Attorney, Agent, or Firm—Merchant, Gould, Smith, Edell, Welter & Schmidt

[57] ABSTRACT

A fiber optic connector module is disclosed having a chassis with walls defining a channis interior and with an access opening exposing the interior. A connector panel is provided sized to cover the access opening with the panel pivotally secured on one side to the chassis for the panel to be pivoted between an open and closed position. A plurality of fiber optic connectors are carried on the panel for pivotal movement therewith.

7 Claims, 6 Drawing Sheets

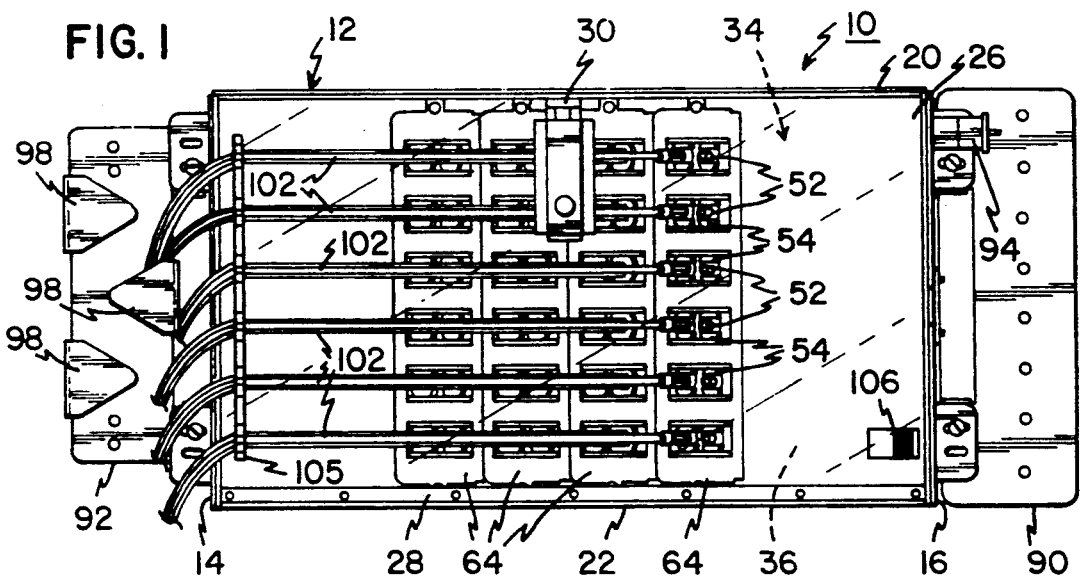
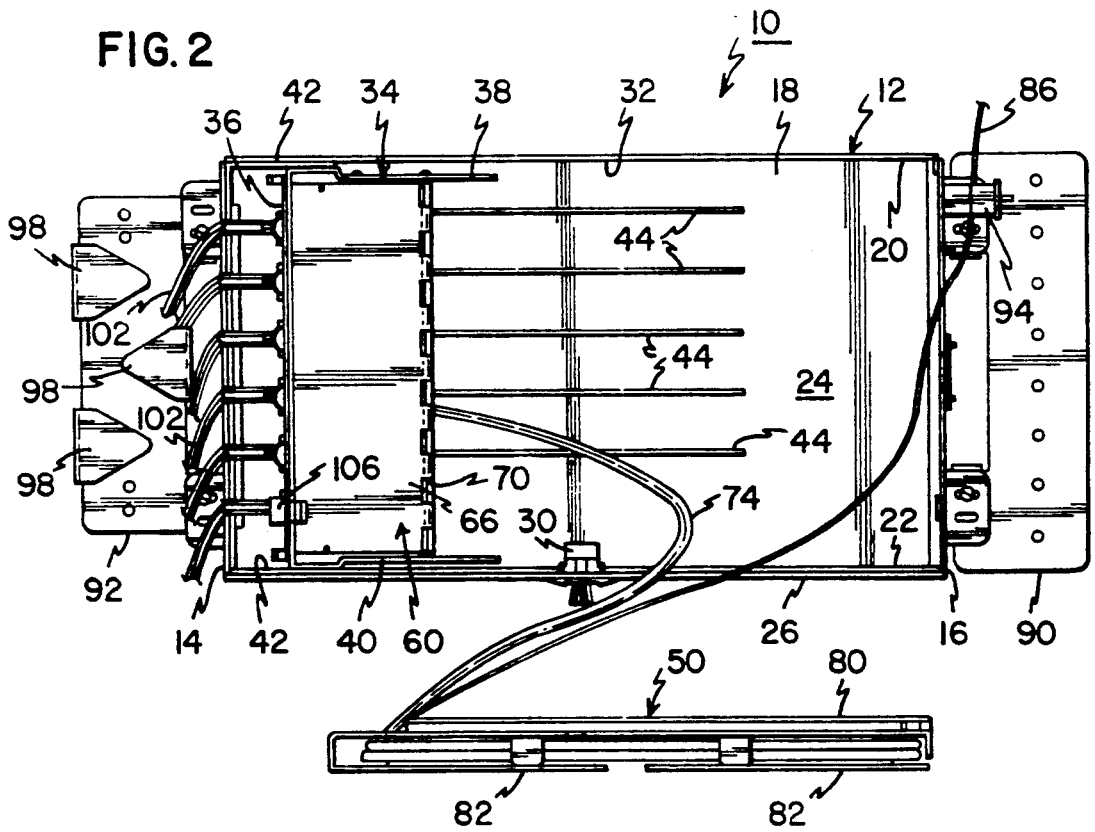

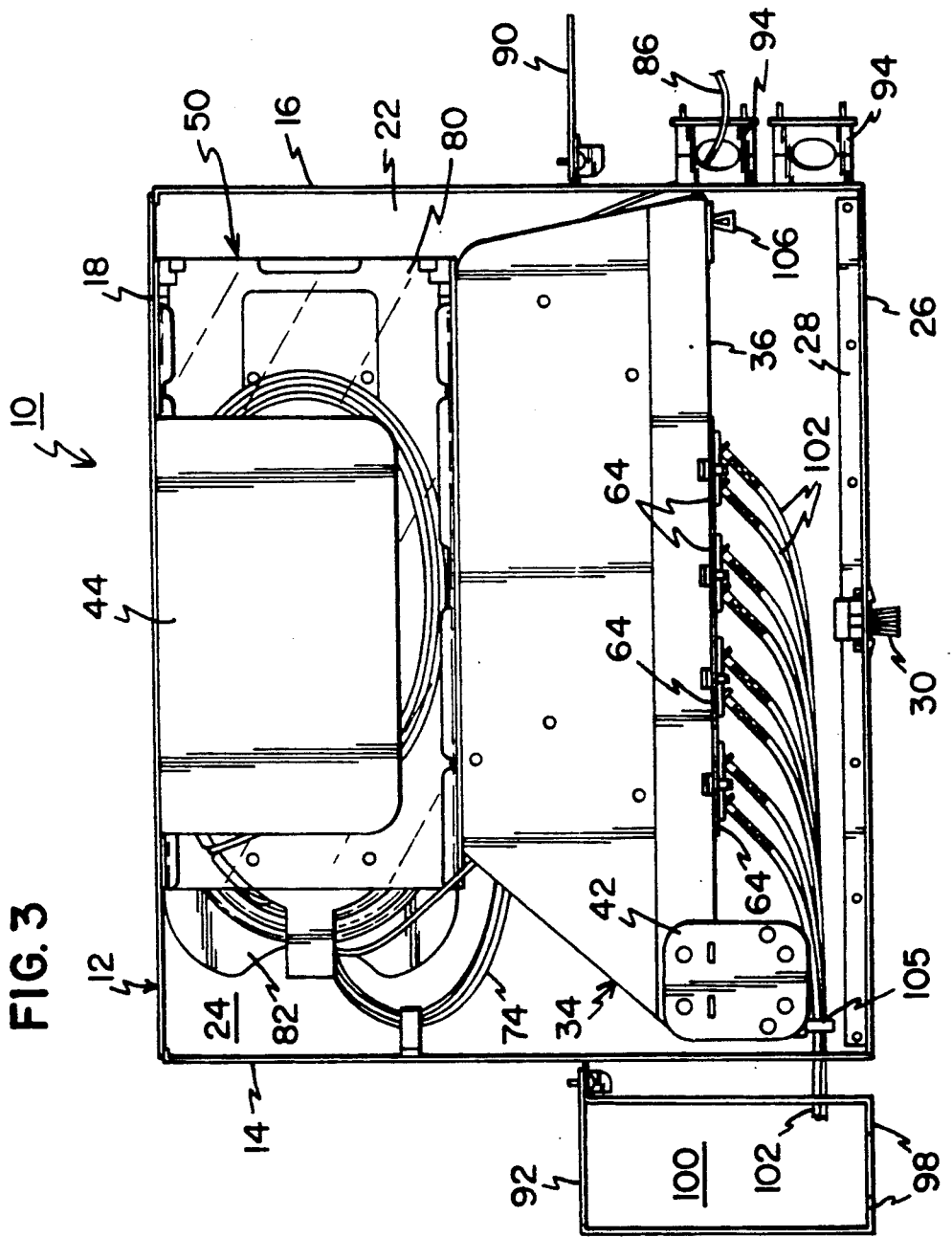

FIBER OPTIC CONNECTOR MODULE

This is a continuation, of application Ser. No. 07/551,423, filed July 11, 1990, now abandoned.

BACKGROUND OF THE INVENTION

1. Field of the Invention

This application pertains to a fiber optic connector module. More particularly, this application pertains to a fiber optic connector module having both connector and splicing functions.

2. Description of the Prior Art

In the telecommunications and data transmission industries, the use of optical fibers as the transmitting medium has grown dramatically. With the increased usage of optical fiber transmission paths, the industry has experienced a dramatic need for new and improved apparatus to affect fiber connections and splices as well as fiber storage. An example of such a product is shown in copending and commonly assigned U.S. patent application Ser. No. 07/388,060 now U.S. Pat. No. 4,995,688. That application shows a fiber distribution frame of modular construction. The frame includes three modularized cabinets for splicing, fiber storage and connector functions. The modularity of the design permits the user of the frame to select and subsequently modify the fiber distribution frame to meet particular design needs.

Notwithstanding the prior improvements made in the art, there is a continuing need for enhanced optical fiber connector module designs to meet specific needs of specific applications while retaining overall requirements of cost effectiveness, accessibility and ease of use. It is an object of the present invention to provide such an improved connector module.

SUMMARY OF THE INVENTION

According to a preferred embodiment of the present invention, a fiber optic connector module is provided. The module includes a chassis having a plurality of walls which define a chassis interior. An access opening is formed through the walls permitting access to the chassis interior. A connector panel is provided and sized to close the opening. The connector panel is pivotally connected to the chassis for the panel to be pivoted between an open and closed position. In the closed position, the connector panel covers the access opening. In the open position, the connector panel is pivoted away to expose the interior of the chassis and permit an operator to have access to the rear of the panel. A plurality of splice trays are provided carried within the interior of the cabinet and accessible when the panel is in the open position.

BRIEF DESCRIPTION OF THE DRAWINGS

FIG. 1 is a front elevational view of a fiber optic connector module according to the present inventions with a connector panel shown in a closed position;

FIG. 2 is the view of FIG. 1 with the connector panel shown in the open position and with a splice tray removed from an interior of the module;

FIG. 3 is a top plan view of the module of FIG. 1 with a top wall of the chassis shown removed to expose the interior of the chassis and with a connector panel shown in a closed position;

DESCRIPTION OF THE PREFERRED EMBODIMENT

Figure 4:
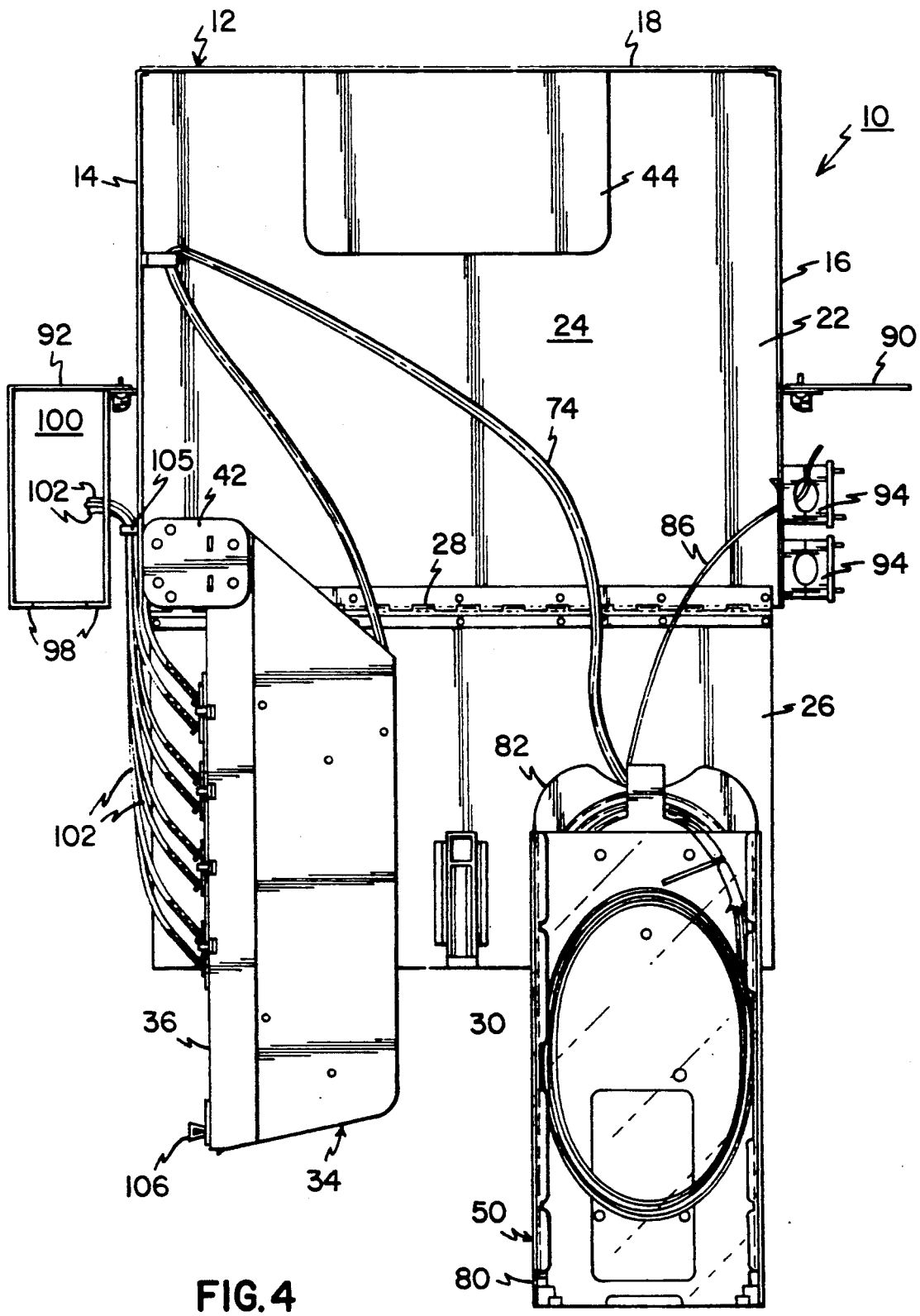
FIG. 4 is a view of FIG. 3 with the connector panel shown in an open position and with a splice tray removed from an interior of the chassis.

Referring now to the several drawings and figures in which identical elements are numbered identically throughout, a description of the preferred embodiment of the present invention will now be provided. A fiber optic connector module 10 is shown in FIGS. 1–5. The module 10 includes a chassis 12 having side walls 14,16, rear wall 18 and top and bottom walls 20,22 which cooperate to define a chassis interior 24.

The chassis includes a clear plastic front wall 26 which is connected to a forward edge of bottom wall 22 by means of a hinge 28. A latch 30 is provided for latching an upper edge of the front wall 26 to a forward edge of the top wall 20 as shown in FIG. 1. So constructed, the front wall 26 may be unlatched and pivoted to the down position as shown in FIG. 2 to define an access opening 32 (FIG. 2) to the interior 24.

A connector panel 34 is provided sized to be received within interior 24. Panel 34 has a forward wall 36 sized substantially to cover the access opening 32. An upper plate 38 (FIG. 2) extends from an upper edge of wall 36 and a lower plate 40 (see FIG. 2) extends from a lower edge of wall 36.

With reference to the view of FIGS. 2–4, upper and lower hinge plates 42 are provided for pivotally connecting the left side of panel 34 (when viewed in FIGS. 1 and 3) to the chassis 12. The hinge plates 42 are disposed so the panel 34 rotates about the vertical axis defined as the dimension between the upper and lower walls 20,22.

A plurality of shelves 44 are provided extending into the interior 24 and attached to back wall 18. Shelves 44 are parallel aligned and spaced apart for each of the shelves 44 to retain and hold a splice tray assembly 50 as will be described.

The wall 36 carries a plurality of optical fiber connectors 52. Connectors 52 for connecting optical fibers are commercially available and form no part of this invention per se.

Commercially available connectors are available in a wide variety of shapes and configurations. To accommodate this variety and add flexibility to the design of the present invention, a plurality of adapters 54 are provided for securing the connectors 52 to the wall 36. Adapters such as adapters 54 form no part of this invention per se and may be such as those shown and described in the aforementioned, commonly assigned, U.S. patent application Ser. No. 07/388,060 now U.S. Pat. No. 4,995,688.

As shown in the drawing figures, the adapters 54 are connected to the wall. The adaptors 54 are selected to retain the connectors 52 at a non-orthogonal angle to the wall 36 with the exposed connectors pointing toward the side of the chassis 12 on which the wall 36 is pivotally connected.

While the adapters 54 could be secured to the wall 36 directly, in a preferred embodiment of the present invention, a plurality of modular connectors packs 60 are provided secured to the wall 36 for pivotal movement therewith. The packs 60 carry the adapters 54 and the connectors 52. As indicated, packs 60 are preferred. However, adaptors 54 can be directly mounted on wall 36.

Figure 5:
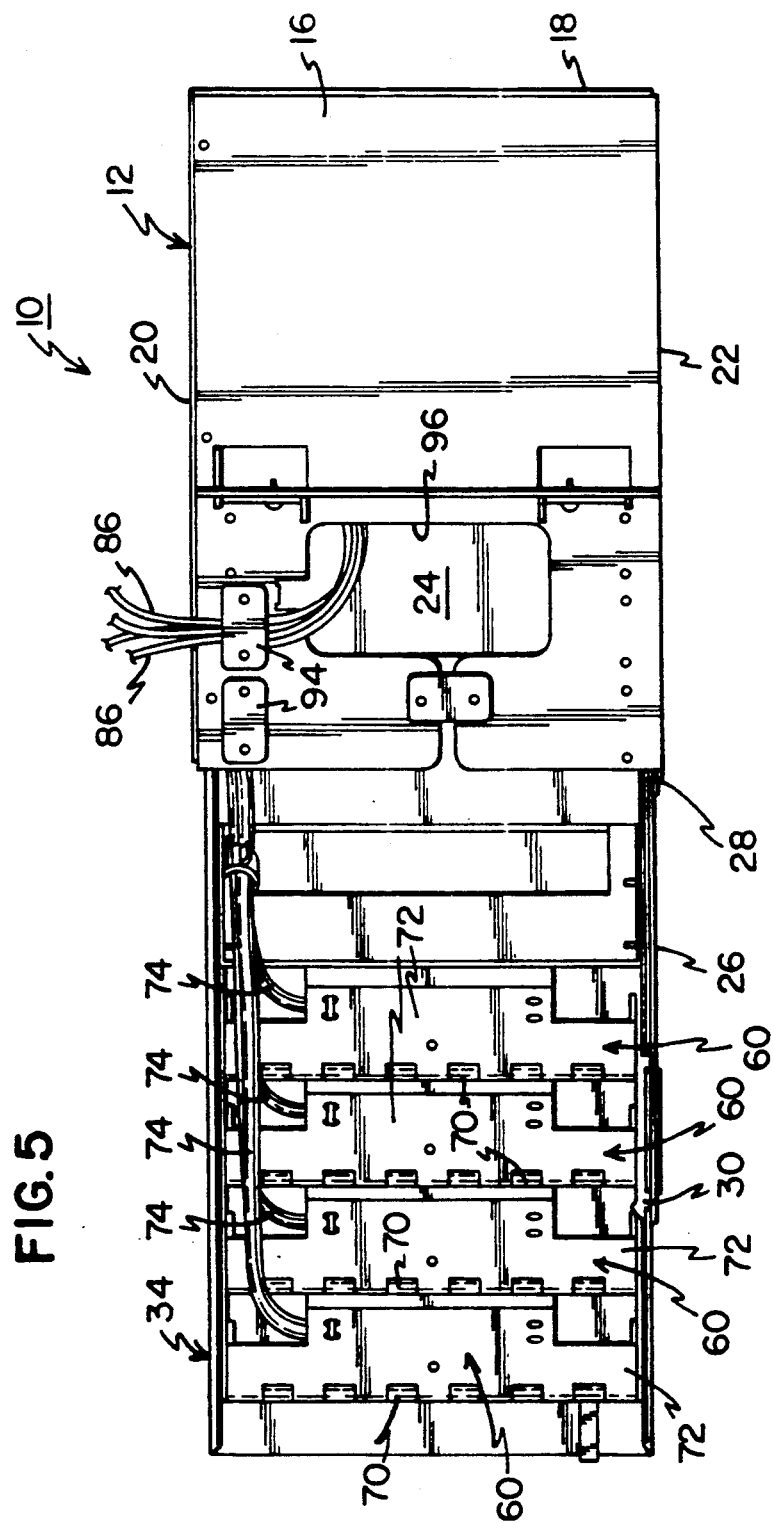
FIG. 5 is a side elevation view of the cabinet of FIG. 2 with a connector panel shown in an open position and without showing a splice tray removed from the chassis.
Figure 6:
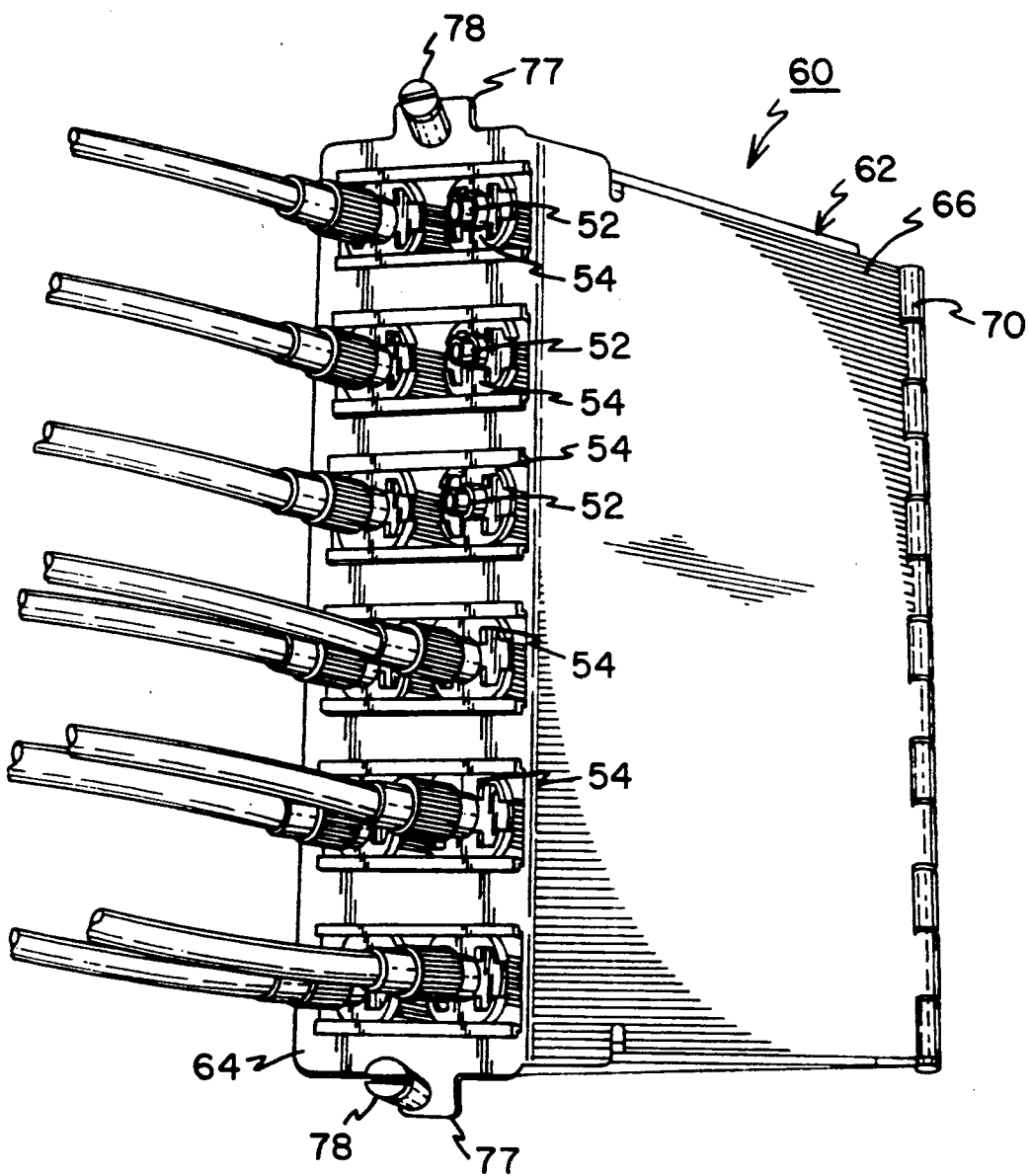
FIG. 6 is a perspective view of a modular connector pack for use in the connector module.
Figure 7:
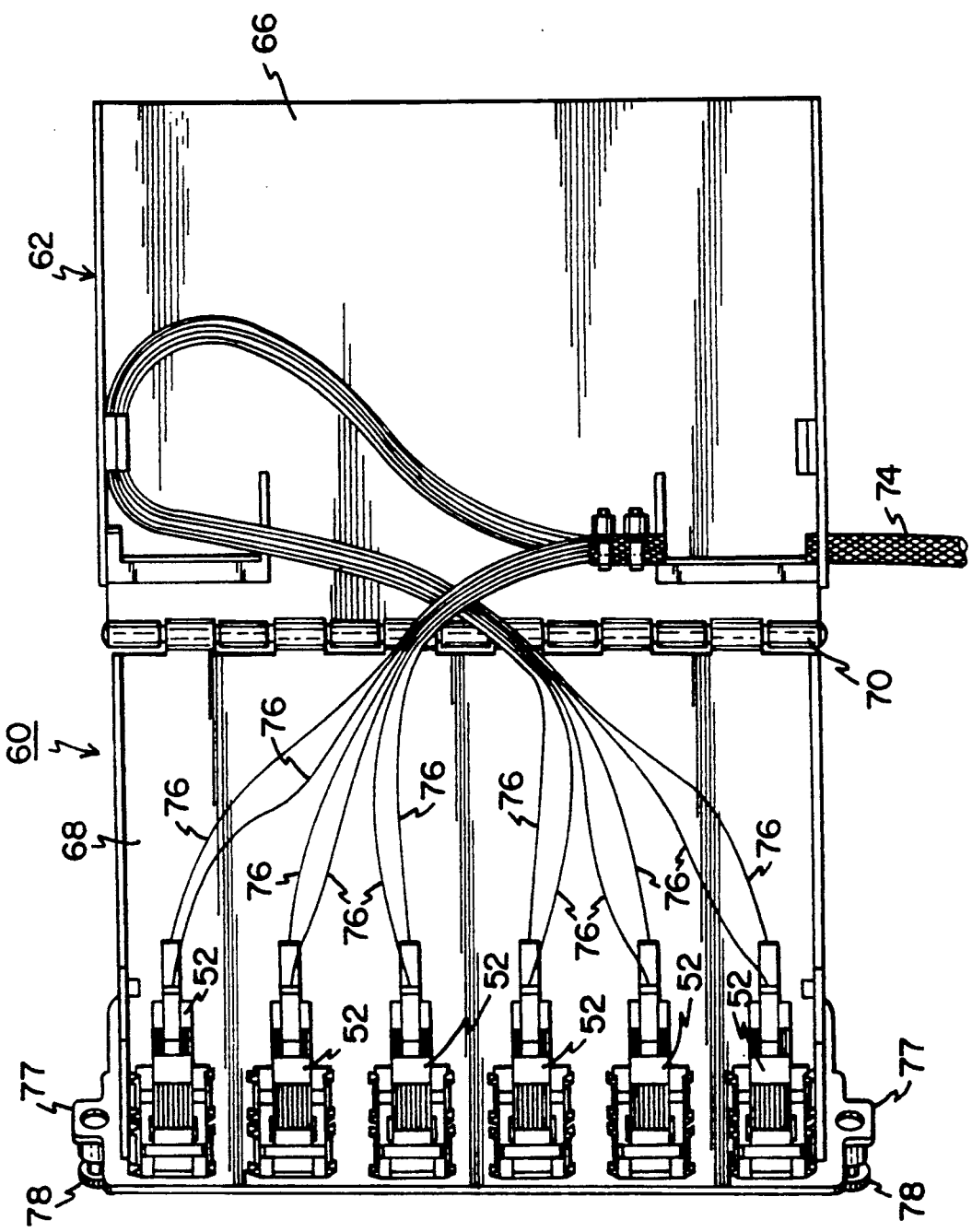
FIG. 7 is a view of the connector pack of FIG. 6 with the connector pack shown open to expose interior elements.

As best shown in FIGS. 6 and 7, the packs 60 include a housing 62 having a forward surface 64 and side walls 66,68 which are connected by a hinge 70. The wall 68 is bent such that when the walls 66,68 are pivoted against one another in a closed position as shown in FIGS. 6 and 5, the housing is closed and presents both forward wall 64 and a rear wall 72 (FIG. 5).

The adapters 54 are secured to openings in the forward wall 64. The connectors 52 are carried by the adapters 54. Within the interior of the pack 60, a cable or pigtail 74 of optical fibers 76 is terminated with individual fibers 76 separately terminated on each of the connectors 52. When closed (as shown in FIG. 6), the pack 60 is a "hard wired" pack of connectors 52 with a single pigtail or cable 74 extending from the pack 60. In the embodiment shown, the pack 60 contains 12 connectors. It will be appreciated that this is a preferred embodiment only. The number may vary while retaining the essence and intent of the present invention.

Mounting tabs 77 extend from forward wall 64 and carry mounting screws 78 for connecting the pack 60 to the wall 36 as shown in FIGS. 1, 3 and 5. When disposed in the wall 36, the packs 60 are aligned in side-by-side relation with the pigtails 74 extending from the back side of connector panel 34 and with connectors 52 exposed on the front side of connector panel 34. (Back side referring to the side exposed to the interior of the cabinet and the front side referring to the opposite surface).

A splice tray assembly 50 is provided having a commercially available splice tray 80 connected to a spool 82. Spool 82 is sized to permit an operator to wrap excess amounts of pigtail 74 or incoming fibers 86 around spool 82 with a radius of bending greater than a minimum radius which might otherwise damage optical fibers (for example, a radius greater than 1½ inches). Within splice tray 80, the optical fibers carried by pigtail 74 may be spliced to incoming fibers 86. (The actual splice mechanism is not shown for purposes of clarity but will be recognized by those skilled in the art as being commercially available).

The chassis 12 includes mounting brackets 90,92 for mounting the chassis 12 to a frame (not shown). Clamps 94 are carried on side wall 16 to hold and retain optical fiber cables. For purposes of clarity, a cable is not shown in the drawings. Instead, individual incoming fibers 86 are shown. The fibers are passed from clamp 94 through a side opening 96 formed in side wall 16 (see FIG. 5).

Connected to mounting bracket 92 are clips 98 which together with bracket 92 define a trough 100 (FIGS. 3, 4) through which fiber optic patch cords 102 may be passed. The patch cords 102 are terminated on connectors 52 and are retained in an organized manner by a fanning clip 105 carried on wall 36. A handle 106 is provided on wall 36 and positioned to be engaged by an operator to pivot the wall about its pivot axis.

With the invention thus described, the connector pack 60 may be provided premanufactured and pre-wired to have a plurality of connectors 52 exposed through a front surface 64 and with a single pigtail or cable 74 extending from the individual connector pack 60. The pack 60 is connected to wall 36 with each of the pigtails 74 having their optical fibers 76 spliced to the incoming optical fibers 86 in splice tray assembly 50. Excess amounts of both incoming fibers 86 and pigtails 74 are carried on spool 82 in a manner to prevent excessive bending of the optical fibers. Patch cord connections are accessible through the forward face of wall 36 by opening front wall 26. Accordingly, the present invention attains both functions of splicing and connecting in a single modular assembly. Also, access to the module is through the forward face. As a result, in developing a telephone office system using the present invention, space need not be provided to permit access to the rear of the frame on which the connector module 10 is attached.

Through the foregoing description of the preferred embodiment, it has been shown how the objects of the present invention have been achieved. However, modifications and equivalents of the disclosed concepts, such as those which would readily occur to one skilled in the art, are intended to be included within the scope of protection.

What is claimed is:

1. A fiber optic connector module comprising:
   a chassis having walls defining a chassis interior with an access opening formed through the walls and exposing said interior;
   a connector panel sized to close said access opening;
   hinge means for pivotally connecting said connector panel to said chassis for said panel to be pivoted between an open and a closed position, said panel substantially covering said access opening when in said closed position and said panel exposing said interior when in said open position;
   a plurality of fiber optic connectors carried on said panel with each of said connectors having means for connecting an optical fiber on a front side of said panel to an optical fiber on a back side of said panel;
   a splice tray disposed within said interior, means for admitting a plurality of incoming optical fibers from an exterior of said chassis to said splice tray, a plurality of intermediate optical fibers connecting said connectors to said incoming fibers at said splice tray;
   said splice tray including a take-up spool to receive excess amounts of incoming optical fibers and intermediate optical fibers.

2. A connector module according to claim 1 comprising a plurality of modular connector packs secured to said panel for pivotal rotation therewith with said connectors secured to said packs and with each of said packs having a housing defining a pack interior, said intermediate optical fibers extending from said packs and terminating within said pack interiors at said connectors.

3. A connector module according to claim 2 wherein each of said packs includes a housing having a plurality of walls defining said interior with said plurality of walls including said forward wall; a plurality of connectors disposed on said forward wall; said intermediate optical fibers including a fiber optic cable having a plurality of individual optical fibers; means for admitting said cable from an exterior of said housing to an interior of said housing and means for terminating said individual optical fibers to said connectors within said interior.

4. A connector module according to claim 3 comprising a plurality of connector adaptors carried on said forward wall with each of said adaptors having means for connection at least one of said connectors.

5. A fiber optic connector module comprising:
a chassis having walls defining a chassis interior with an access opening formed through the walls and exposing said interior;
a connector panel sized to close said access opening;
hinge means for pivotally connecting said connector panel to said chassis for said panel to be pivoted between and open and a closed position, said panel substantially covering said access opening when in said closed position and said panel exposing said interior when in said open position;
a plurality of fiber optic connectors carried on said panel with each of said connectors having means for connecting an optical fiber on the front side of said panel to an optical fiber on the back side of said panel;
said connector module further including at least one modular connector pack secured to said panel for pivotal rotation therewith, said connectors secured to said pack with said packs having a housing defining a pack interior, said intermediate optical fibers extending from said pack and terminating within said pack interior at said connectors.

6. The fiber optic connector module according to claim 5 wherein said pack includes a housing having walls defining said interior, said plurality of walls including a forward wall; said plurality of connectors disposed on said forward wall; said intermediate optical fibers including a fiber optic cable having a plurality of individual optical fibers; means for admitting said cable from an exterior of said housing to said interior and means for terminating said individual optical fibers to said connectors within said interior;

7. A fiber optic connector module according to claim 5 wherein said pack includes a plurality of connector adaptors secured to said forward walls, with each of said adaptors having means for connecting to a plurality of different connectors of differing shapes.

* * * * *